United States Patent
Yanagisawa et al.

(10) Patent No.: US 6,862,097 B2
(45) Date of Patent: Mar. 1, 2005

(54) THREE-DIMENSIONAL SHAPE MEASURING METHOD, AND THREE-DIMENSIONAL SHAPE MEASURING APPARATUS

(75) Inventors: Kuniaki Yanagisawa, Moriyama (JP); Ryo Nishiki, Omihachiman (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 10/609,247

(22) Filed: Jun. 26, 2003

(65) Prior Publication Data

US 2004/0004727 A1 Jan. 8, 2004

(30) Foreign Application Priority Data

Jul. 4, 2002 (JP) .................................... 2002-196217

(51) Int. Cl.[7] .............................................. G01B 11/24
(52) U.S. Cl. ...................................... 356/602; 356/625
(58) Field of Search ................................ 356/600–625, 356/503, 446; 359/363, 368, 378–389, 232, 234–236

(56) References Cited

U.S. PATENT DOCUMENTS

| | | | | |
|---|---|---|---|---|
| 3,617,135 A | * | 11/1971 | Betz ............................ 356/400 |
| 3,683,773 A | * | 8/1972 | Dudley ......................... 396/330 |
| 3,787,117 A | * | 1/1974 | Watkins ........................ 353/20 |
| 3,843,227 A | * | 10/1974 | Kato et al. .................... 359/387 |
| 4,017,147 A | * | 4/1977 | Weber et al. ................. 359/373 |
| 4,668,094 A | * | 5/1987 | Matsumoto et al. ......... 356/603 |
| 4,846,578 A | * | 7/1989 | Morita et al. ................ 356/446 |
| 4,867,570 A | * | 9/1989 | Sorimachi et al. ........... 356/603 |
| 4,873,653 A | * | 10/1989 | Grosskopf ..................... 359/371 |
| 5,136,627 A | * | 8/1992 | Conrads et al. .............. 378/206 |
| 5,301,003 A | * | 4/1994 | Ikeda ............................ 356/73 |
| 5,307,153 A | * | 4/1994 | Maruyama et al. .......... 356/604 |
| 5,608,529 A | * | 3/1997 | Hori ............................. 356/609 |
| 6,031,661 A | * | 2/2000 | Tanaami ....................... 359/368 |
| 6,288,382 B1 | * | 9/2001 | Ishihara ....................... 250/201.3 |
| 6,388,808 B1 | * | 5/2002 | Tanaami ....................... 359/368 |
| 6,426,835 B1 | * | 7/2002 | Endo et al. ................... 359/388 |

FOREIGN PATENT DOCUMENTS

DE 19614885 C1 * 9/1997 ............ A61B/8/00

* cited by examiner

Primary Examiner—Gregory J. Toatley, Jr.
Assistant Examiner—Sang H. Nguyen
(74) Attorney, Agent, or Firm—Ostrolenk, Faber, Gerb & Soffen, LLP

(57) ABSTRACT

A three-dimensional shape measuring method and a three-dimensional shape measuring apparatus of excellent measurement accuracy. An optical system comprises a light source, a pattern forming unit which is disposed on the optical axis of the light source to form slit light from the light from the light source, and a projection lens to collect the slit light on the object for measurement. An asymmetric diaphragm having an aperture in which the size in the direction perpendicular to the slit direction is smaller than the size in the slit direction is provided in order to stop the slit light. An image pickup optical system is provided to measure the three-dimensional shape of the object for measurement on the basis of the slit light reflected from the object for measurement.

28 Claims, 12 Drawing Sheets

THREE-DIMENSIONAL SHAPE MEASURING METHOD, AND THREE-DIMENSIONAL SHAPE MEASURING APPARATUS

BACKGROUND OF THE INVENTION

1. Field of the Invention

The present invention relates to a three-dimensional shape measuring method and a three-dimensional shape measuring apparatus for measuring a three-dimensional shape of an electronic component, a solder bump, or a conductive paste, for example, by a light-section method.

2. Description of the Related Art

Requests have been made for carrying out 100% inspection of objects for measurement such as electronic components in a non-destructive manner and measuring a three-dimensional shape of an object in a non-contact manner in order to rapidly carry out the inspection. A light-section method is known as one of these measuring methods.

The above light-section method is a method of projecting a slit light on the object on a measurement table, taking in a beam-split image reflected by the object by a camera as image data, and obtaining a three-dimensional shape (such as a position of unevenness) on a surface of the object by the principle of triangulation. It has been used in an inspection apparatus for apparel and medical use.

In addition, in the above light-section method, a method of projecting not a single slit light but a plurality of slit lights (hereinafter, referred to as the "multi-slit light") simultaneously on the object for measurement (a pattern light projection method) is effective. This is because measurement of a plurality of points is simultaneously performed, and the time of measurement can be considerably shortened.

In another conventional light-section method, shown in FIG. 12, a method has been employed, in which, in the measurement of a three-dimensional shape utilizing a multi-slit method, a spot light emitted from a light source 21 (for example, a laser beam source is used for a light source from the viewpoint of the characteristics of high brightness and light collection) is formed into a single slit light by a slit forming means 22 such as a cylindrical lens, and a multi-slit light 24 is formed by a scanning mechanism 23 such as a polygon mirror. The multi-slit light is projected on the object for measurement, and the reflected light is picked up by an image pickup optical system (not shown) to measure a three-dimensional shape.

When the multi-slit light is projected on the object for measurement in order to enable the measurement of the three-dimensional shape with high accuracy, it is necessary to adjust the focus on the object for measurement, and to project the multi-slit light without any blur Differences in the heights of objects for measurement, for example, may make it difficult to adjust the focus in every area of the object for measurement when projecting the multi-slit light. To solve this problem, the focal depth of the projection optical system may be increased, and the use of a diaphragm in a projection optical system for this purpose has been known as a general optical technology.

However, if a diaphragm is used in the projection optical system, there is a balance between the critical values of the focal depth and the quantity of light. In other words, the smaller the diameter of the diaphragm (an aperture), the larger the focal depth. However, there is a disadvantage that the quantity of light is reduced. If the quantity of light is too small, reliability of the result of measurement is degraded, and measurement of high accuracy cannot be performed.

SUMMARY OF THE INVENTION

The present invention has been made in light of the above problems, and the present invention provides a three-dimensional shape measuring method and a three-dimensional shape measuring apparatus in which degradation of the quantity of light is small, and measurement can be performed with high accuracy by increasing the focal depth of multi-slit light.

In order to solve the above problems, in the three-dimensional shape measuring method of the present invention, the slit light from an optical system having a light source is stopped asymmetrically in a slit direction and in a direction perpendicular thereto for use in light-section method, and projected on an object for measurement. A three-dimensional shape of the object is measured on the basis of the reflected slit light from the object.

According to the above method, the slit light is stopped asymmetrically in the slit direction and in the direction perpendicular thereto. The focal depth in the optical system can be increased thereby. While a diaphragm is conventionally used in order to increase the focal depth, this diaphragm has circular and regular polygonal apertures, and the size in the longitudinal direction is equal to the size in the transverse direction. In other words, the light is limited similarly both in the longitudinal direction and in the transverse direction, and the quantity of light is considerably reduced. Contrary to this, in the above method, the directional slit light is stopped asymmetrically in the slit direction and in the direction perpendicular thereto, so that the degree of reduction of the quantity of light can be reduced. Accordingly, the focal depth in the projection optical system can be increased while mitigating the reduction of the quantity of light, so that the three-dimensional shape of an electronic component, a solder bump, a conductive paste, etc. which requires excellent resolution in the height direction can be measured with high accuracy.

In the above measuring method, a plurality of slit lights may be used. According to the above method, the measurement becomes efficient by using a plurality of slit lights.

In the above measuring method, the light source is preferably less coherent than a laser beam, and more preferably, may be a white light source. Since the light source less coherent than laser beam, in particular, a white light source, is used, measurement of higher accuracy can be performed in the measurement of the three-dimensional shape of an object for measurement such as an electronic component, a solder bump, a conductive paste, etc., with highly precise height resolution.

In addition, in a conventional system which forms multi-slit light by using a laser beam, a scanning mechanism and the control thereof are required. Contrary to this, in the method of the present invention, only projection is required via the slit pattern in order to form the multi-slit light by using a light source less coherent than a laser beam, so that the configuration is simplified, and a measuring apparatus is inexpensive.

In order to solve the above problems, the three-dimensional shape measuring apparatus of the present invention comprises an optical system comprising a light source, a pattern forming unit which is disposed on the optical axis of the light source to form the slit light by using the light from the light source, and a projection lens which collects and projects the slit light onto the object for measurement, an asymmetric diaphragm having an aperture to stop the slit light in which the size in the direction perpendicular to the slit direction is smaller than the size in the slit direction, and a detection unit to measure the three-dimensional shape of the object for measurement based on the slit light reflected from the object for measurement.

In the above configuration, the asymmetric diaphragm is provided to increase the focal depth in the optical system. While a diaphragm is conventionally used in order to increase the focal depth, this diaphragm has circular and regular polygonal apertures, and the size in the longitudinal direction is equal to the size in the transverse direction. In other words, the light is limited similarly both in the longitudinal direction and in the transverse direction, and the quantity of light is considerably reduced. Contrary to this, in the above configuration, the asymmetric diaphragm is used for stopping the directional slit light primarily in the direction (the transverse direction) perpendicular to the slit direction (the longitudinal direction). In other words, an aperture of a small size may be formed in the transverse direction. The degree of reduction of the quantity of light limited by this asymmetric diaphragm can thus be reduced. Accordingly, the focal depth in the projection optical system can be increased while mitigating the reduction of the quantity of light, so that the three-dimensional shape of an electronic component, a solder bump, a conductive paste, etc. which requires excellent resolution in the height direction can be measured with high accuracy.

The pattern forming unit preferably forms a plurality of slit lights. In the above configuration, the measurement becomes efficient by using a plurality of slit lights.

Other features and advantages of the present invention will become apparent from the following description of embodiments of the invention which refers to the accompanying drawings.

DESCRIPTION OF EMBODIMENTS OF THE INVENTION

Embodiments of a three-dimensional shape measuring method and a three-dimensional shape measuring apparatus of the present invention will be described below.

First Embodiment

Figure 1:
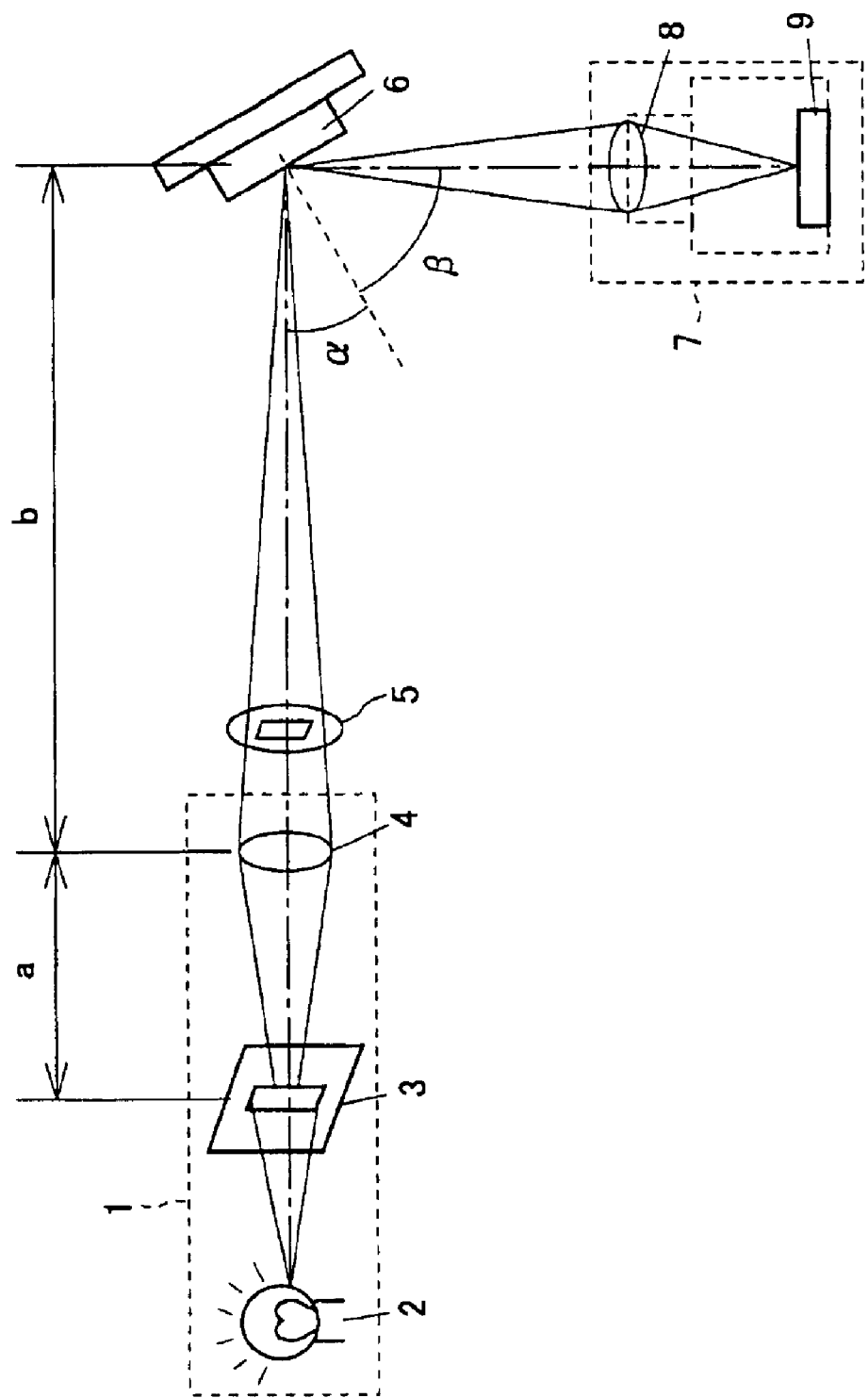
FIG. 1 is a schematic view of a first embodiment of a three-dimensional shape measuring method and a three-dimensional shape measuring apparatus of the present invention.

FIG. 1 is a schematic view of a three-dimensional shape measuring method and a three-dimensional shape measuring apparatus according to a first embodiment of the present invention. In the three-dimensional shape measuring apparatus, a projection optical system 1 is provided as shown in FIG. 1. The projection optical system 1 comprises a light source 2, a pattern forming unit 3 which is an optical slit, and a projection lens 4 which is, for example, a collective lens of the focal length f=48 mm.

Figure 2:
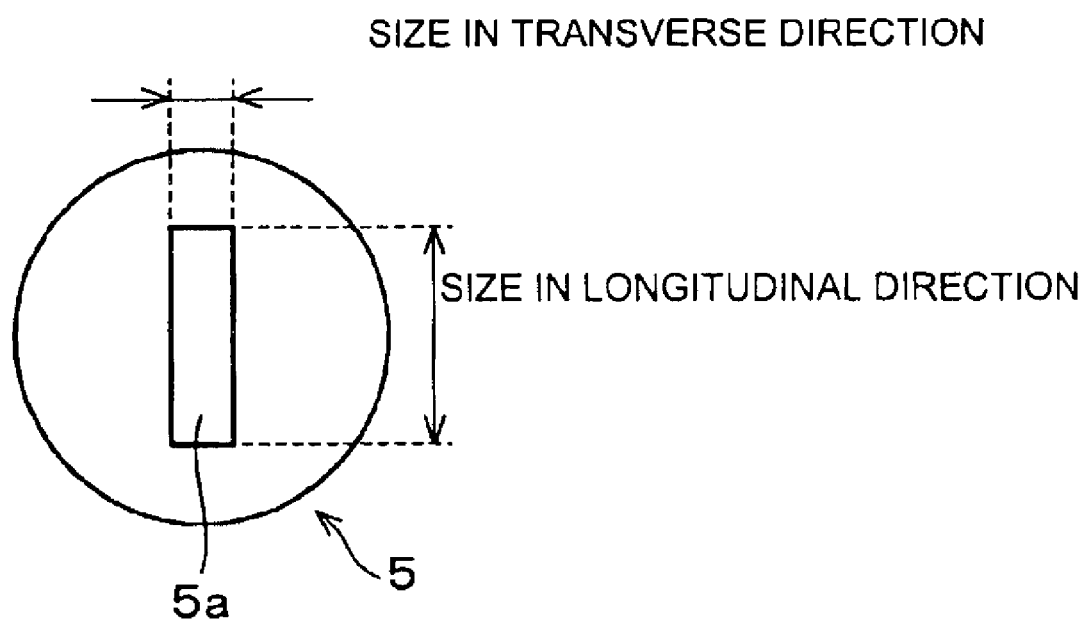
FIG. 2 is a front view of an example of an asymmetric diaphragm used in the three-dimensional shape measuring method.

In addition, an asymmetric diaphragm (a diaphragm) 5 is provided between the projection lens 4 and an object 6 for measurement. This asymmetric diaphragm 5 has a rectangular aperture 5a (FIG. 2) in which the size in its transverse direction, which is perpendicular to the longitudinal direction of the slit of the pattern forming unit 3, is smaller than the size in the direction parallel to the slit direction as shown in FIG. 2. In other words, the asymmetric diaphragm 5 has a configuration such that its size is asymmetrical in the longitudinal direction and in the transverse direction of the aperture.

This asymmetric diaphragm 5 may also be disposed between the projection lens 4 and the pattern forming unit 3.

Figure 3:
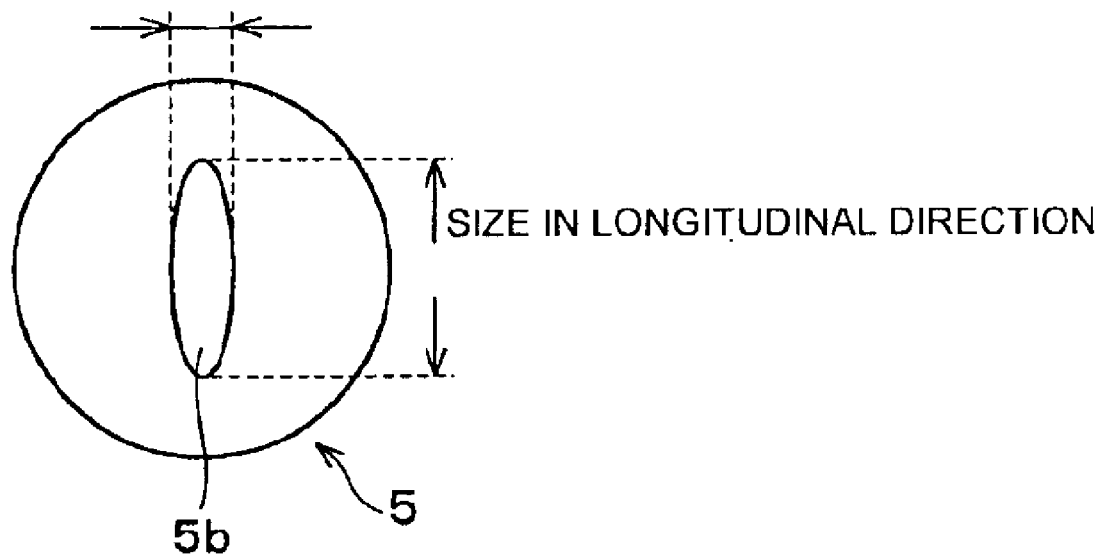
FIG. 3 is a front view of a modification of the asymmetric diaphragm used in the three-dimensional shape measuring method.

In addition, the asymmetric diaphragm 5 may have an elliptical aperture 5b as shown in FIG. 3. The major axis of this elliptical aperture 5b is parallel to the slit direction. In other words, the size in the longitudinal direction is larger than the size in the transverse direction.

Figure 4:
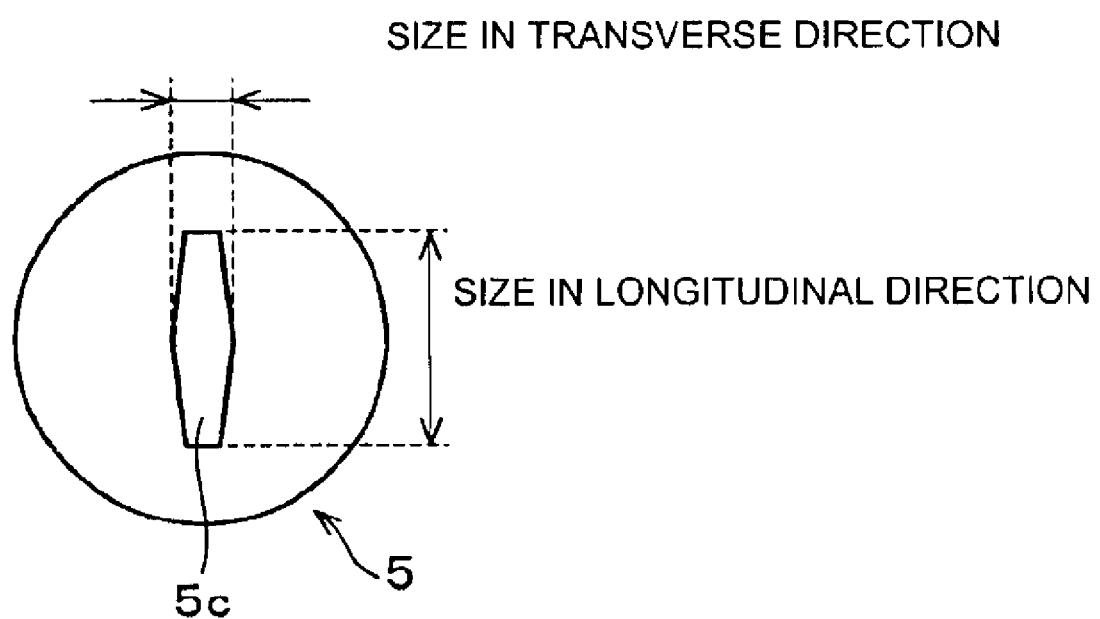
FIG. 4 is a front view of another modification of the asymmetric diaphragm used in the three-dimensional shape measuring method.

In addition, the asymmetric diaphragm 5 may have a polygonal aperture 5c as shown in FIG. 4. The polygonal shape of this aperture 5c is not limited, but arbitrary. In the polygonal shape, the size of a longest part in the direction parallel to the longitudinal direction (the size in the longitudinal direction) is larger than the size of a longest part in the direction parallel to the transverse direction (the size in the transverse direction).

The light source 2 may be less coherent (with the coherence length of several millimeters or less) than laser beam (with the coherence length of 1 mm or over). However, a white light source (with a coherence length of several $\mu$m below 10 $\mu$m) such as a halogen light source or a metal halide light source is preferable from the viewpoint of low coherence. In place of the white light source, a light emitting diode of a single wavelength light source with a coherence length of 10 to 20 $\mu$m may also be used for the light source 2. The laser beam is a single wavelength light source, and the coherence length thereof is about several mm with a laser diode, and 20 to 30 cm with a He—Ne laser.

The optical slit of the pattern forming unit 3 may be formed by vapor-depositing a light-reflective dielectric layer such as chromium on a surface of a substrate formed of a material of excellent light transmissivity such as an optical glass to define a slit. Further, in place of the optical slit, an air slit may also be used. The air slit may be formed by drilling a substrate formed of a hard and opaque (light-shielding) material such as stainless steel in a slit shape by a laser or the like.

The light emitted from the light source 2 is formed into the slit light by the pattern forming unit 3 on the optical axis thereof, and collected by the projection lens 4, and stopped (limited) by the asymmetric diaphragm 5, and projected on the substantially parallelepiped object 6 at the projection angle α (30° in the present embodiment, i.e., with respect to the direction orthogonal to the surface direction of the object 6 for measurement (the normal direction). In the first embodiment, the projection angle α is set up to 30°. But, it is not limited to 30°. The light emitted from the light source 2 may be projected to the object 6 so that the projection angle α is set up between 0° to 85°. Alternatively, when the asymmetric diaphragm 5 is disposed between the projection lens 4 and the pattern forming unit 3, the light emitted from the light source 2 is formed into the slit light by the pattern forming unit 3 on the optical axis thereof, stopped (limited) by the asymmetric diaphragm 5, collected by the projection lens 4, and projected on the substantially parallelepiped object 6 at the projection angle α.

In this condition, the line width of the projected slit light is determined by the projection angle α and the magnification of the projection optical system 1. The line width of the slit light is expressed by the formula w=m (w0/cos α), where m=(b/a) is the magnification thereof, and w0 is the slit width of the pattern forming unit 3.

Figure 5:
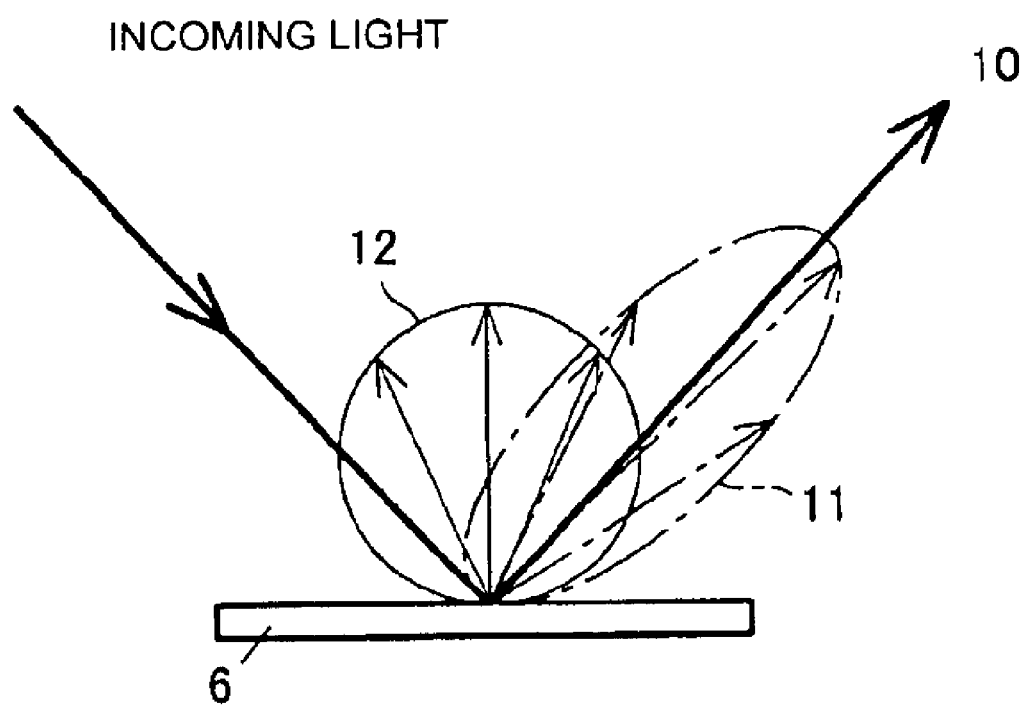
FIG. 5 is a schematic representation of various kinds of reflections in the three-dimensional shape measuring method.

The slit light projected on the object 6 is reflected by the surface of the object 6 at a ratio according to the reflection characteristic of the object 6. The reflected light is composed of the regularly reflected light 10, the scattered light 11, and the diffused light 12 as shown in FIG. 5. The light reflected at the image pickup angle β (which is set to 60° to the normal in the present embodiment) out of the reflected light is picked up in a CCD 9 as a light-section image according to the surface shape by an image pickup lens 8. An image pickup optical system (detection unit) 7 is formed by the image pickup lens 8 and the CCD 9. The image pickup lens 8 includes a CCTV lens (a video lens) with the focal length f=50 mm.

As described above, in the first embodiment, the asymmetric diaphragm 5 is provided. The focal depth in the projection optical system 1 can be increased thereby. In a conventional practice, a diaphragm is generally used in order to increase the focal depth. However, this diaphragm has circular and regular polygonal apertures, and the size in the longitudinal direction is equal to the size in the transverse direction. In other words, the light is limited similarly both in the longitudinal direction and in the transverse direction, and the quantity of light is considerably reduced. Contrary to this, in the present embodiment, the asymmetric diaphragm 5 is used for the directional slit light, and may be stopped primarily in the direction (the transverse direction) perpendicular to the slit direction (the longitudinal direction). In other words, an aperture of a small size may be formed in the transverse direction. The degree of reduction of the quantity of light limited by this asymmetric diaphragm 5 can thus be reduced.

Accordingly, in the present embodiment, the focal depth in the projection optical system can be increased while suppressing reduction of the quantity of light, and the three-dimensional shape of an electronic component, a solder bump, a conductive paste, etc. which requires good resolution in the height direction can be measured with high accuracy.

Second Embodiment

Figure 6:
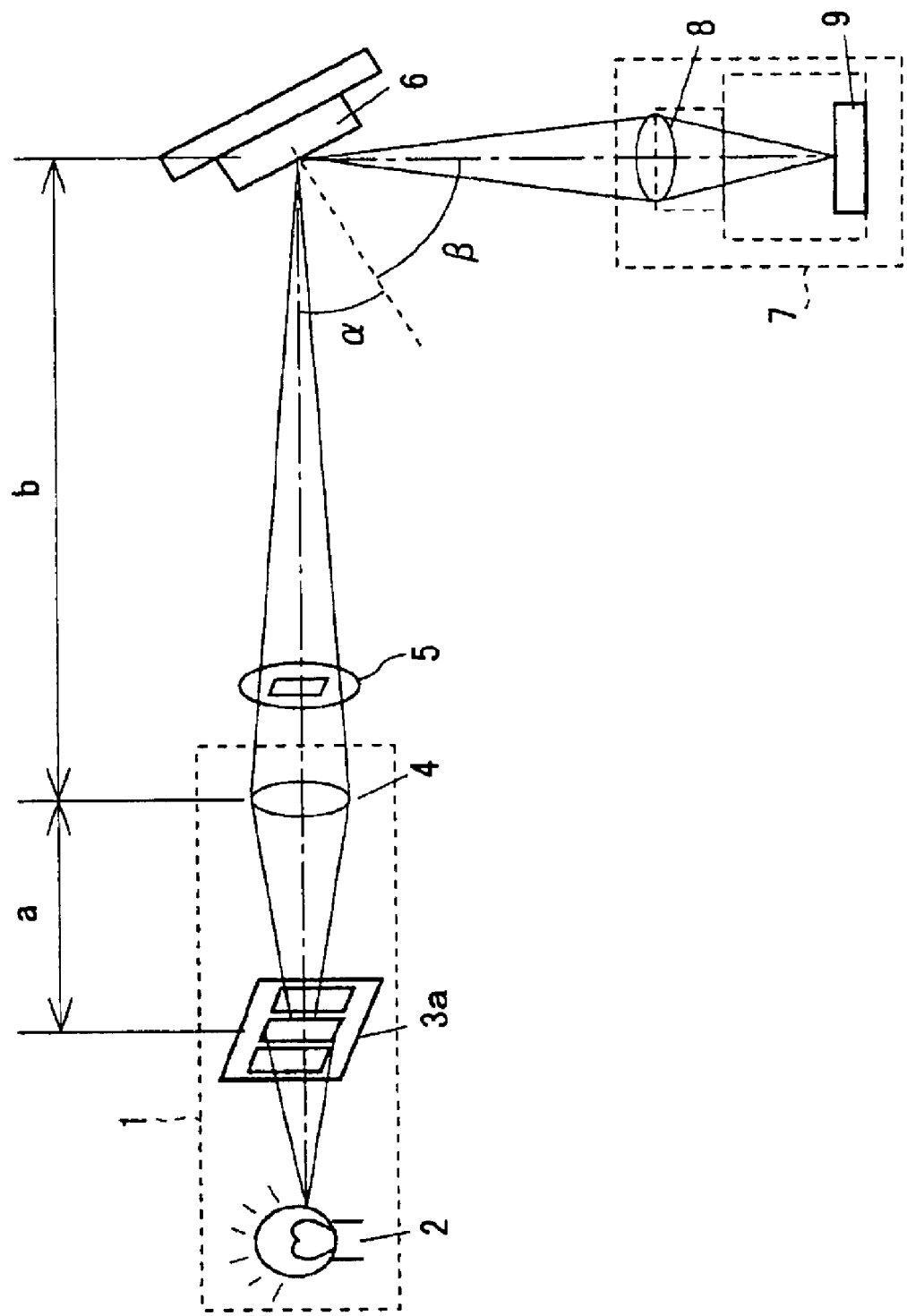
FIG. 6 is a schematic view of a second embodiment of a three-dimensional shape measuring method and a three-dimensional shape measuring apparatus of the present invention.

A three-dimensional shape measuring method and a three-dimensional shape measuring apparatus according to a second embodiment of the present invention will be described below. FIG. 6 is a schematic view of the three-dimensional shape measuring apparatus according to the second embodiment of the present invention. In the three-dimensional shape measuring apparatus, the light source 2, a pattern forming unit 3a of a plurality of slits, and the projection lens 4 are provided in the projection optical system 1 as shown in FIG. 6. In each embodiment described below, components according to the present embodiment which are identical to or correspond to those in the first embodiment are represented by the same reference numerals, and a detailed description thereof is omitted.

Figure 7:
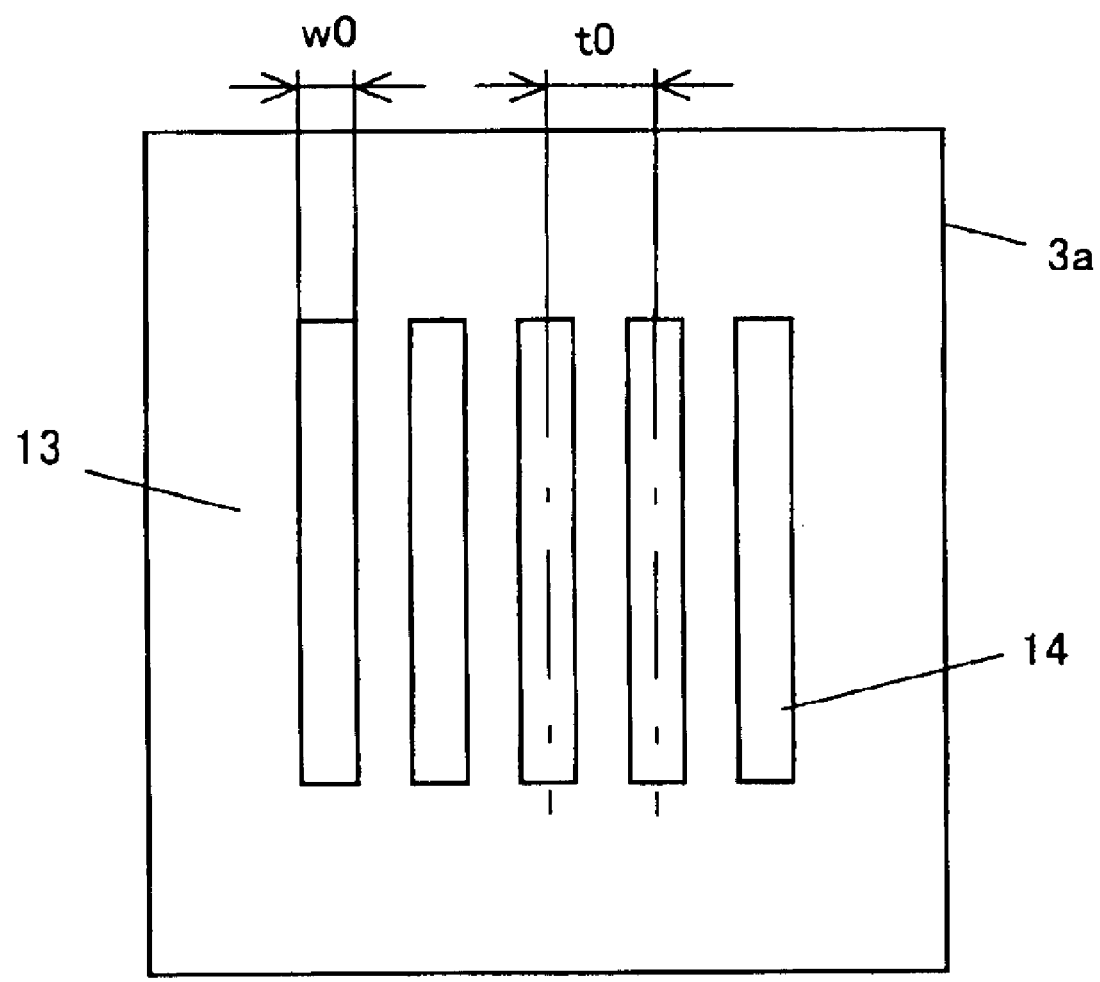
FIG. 7 is a front view of a pattern forming unit having a plurality of slits in the three-dimensional shape measuring method and the three-dimensional shape measuring apparatus.

The pattern forming unit 3a is shown in FIG. 7. It comprises a light shielding unit 13 and a light shielding unit 14, and the light can be transmitted through only the light shielding unit 14. The light emitted from the light source 2 is formed into the multi-slit light by the pattern forming unit 3a on the optical axis thereof, and projected onto the object 6 for measurement at the projection angle α by the projection lens 4.

The line width of the projected multi-slit light and the slit interval are determined by the projection angle α and the magnification of the projection optical system 1. The line width (w) of the slit light and the slit interval (t) are expressed by formulae w=m (w0/cos α), and t=m (t0/cos α), respectively, where m=(b/a) is the magnification thereof, w0 is the slit width of the pattern forming unit 3a, and t0 is the slit interval. The above optical conditions are those of the first embodiment except the slit interval (t).

The slit light projected on the object 6 is reflected by the surface of the object 6 at a ratio according to the reflection characteristic of the object 6. The reflected light is composed of the regularly reflected light 10, the scattered light 11, and the diffused light 12 as shown in FIG. 5. The light reflected at the image pickup angle β out of the reflected light is picked up by the CCD 9 as a light-section image according to the surface shape by the image pickup lens 8.

Next, the operation and advantages of the second embodiment will be described below. In addition to the operation and advantages of the first embodiment, no scanning mechanism is necessary, and the projection optical system 1 capable of projecting the multi-slit light can be constituted with a simple configuration.

When the reflection components of the object for measurement include the scattered light or the diffused light in addition to the regularly reflected light, the size of the light-section image is larger than the line width of the projected slit light, and if the ratio of the scattered light and the diffused light is large, adjacent light-section images can possibly be misidentified. However, in such a case, the three-dimensional shape measuring method of the second embodiment can project the multi-slit light at an arbitrary slit light interval capable of identifying adjacent light-section images by changing the magnification of the projection optical system 1. In other words, by changing the magnification of the projection optical system 1, the multi-slit light of a suitable line width and interval according to the reflection characteristic of the object 6 can be projected.

In addition, the multi-slit light of small dimensional errors and complicated patterns can be correctly projected by using photo etching to form the pattern forming unit 3a of the plurality of slits.

Third Embodiment

A three-dimensional shape measuring apparatus according to a third embodiment of the present invention will be described with reference to FIGS. 8 and 9.

Figure 8:
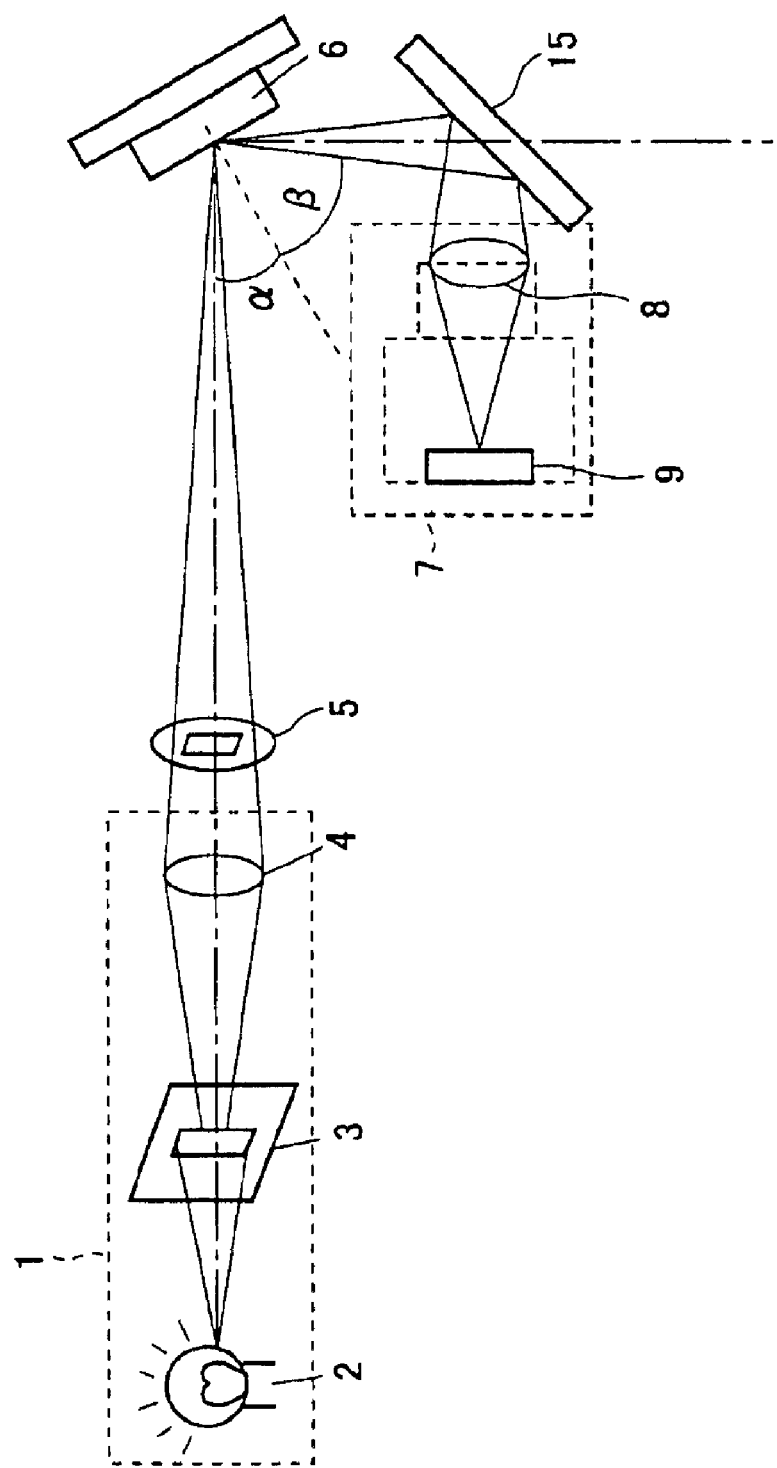
FIG. 8 is a schematic view of a three-dimensional shape measuring apparatus according to a third embodiment of the present invention.
Figure 9:
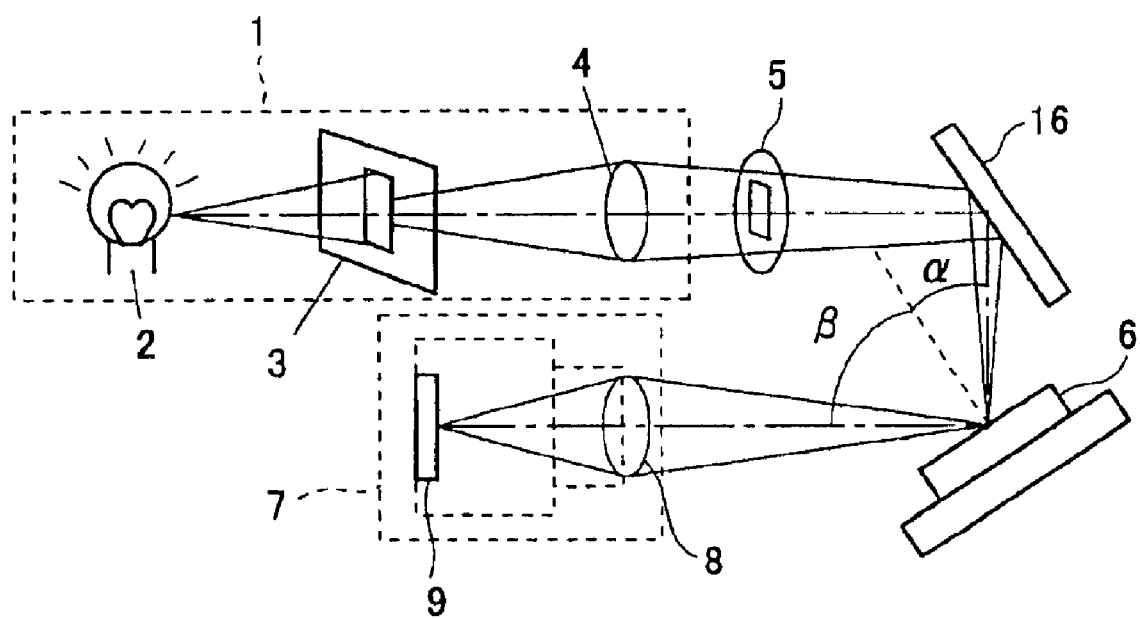
FIG. 9 is a schematic view of a modification of the three-dimensional shape measuring apparatus.

As shown in FIG. 8, a mirror (a reflective optical system) 15 to reflect the reflected light is further provided on the three-dimensional shape measuring apparatus on the optical path between the object 6 and the image pickup optical system (detection unit) 7 so that the optical axis of the irradiated light from the projection optical system 1 is substantially parallel to the optical axis of the reflected light from the object 6 incident on the image pickup optical system (detection unit) 7.

By providing this mirror 15, the size of the entire measuring apparatus (in the longitudinal direction in FIG. 8, i.e., in the direction orthogonal to the optical axis of the light reaching the object 6 from the projection optical system 1) can be set to be small.

A modification of the three-dimensional shape measuring apparatus will be described with reference to FIG. 9. In the third embodiment of FIG. 8, an example is introduced, in which the mirror 15 is provided on the optical path between the object 6 for measurement and the image pickup optical system (detection unit) 7. However, the present invention is not limited thereto. For example, as shown in FIG. 9, in place of the mirror 15, a mirror (a reflective optical system) 16 to reflect the irradiated light may be provided on the optical path between the object 6 for measurement and the projection optical system 1 so that the optical axis of the irradiated light from the projection optical system 1 is substantially parallel to the optical axis of the reflected light from the object 6 incident on the image pickup optical system (detection unit) 7.

The mirror 16 is preferably set so that the irradiated light is incident on the object 6 at the angle of incidence α with respect to the virtual normal direction on the object 6, and the angle of reflection from the object 6 is set to be β with respect to the normal direction.

By providing the mirror 16, the size of the entire measuring apparatus (in the longitudinal direction in FIG. 9, i.e., in the direction orthogonal to the optical axis of the light reaching the object 6 from the projection optical system 1, and the direction of the optical axis) can be set to be small.

In the three-dimensional shape measuring method according to the third embodiment, a white light source is used for a light source in the three-dimensional shape measuring method using the light-section method, the slit light (a single slit light, a plurality of slit lights) formed by the pattern forming unit and the projection lens disposed on the optical axis is projected on the object for measurement while being stopped asymmetrically in the slit direction and in the direction perpendicular thereto, the projected slit light is picked up via the reflective optical system, and the three-dimensional shape of the object for measurement is measured thereby.

In another three-dimensional shape measuring method according to the third embodiment, a white light source is used for a light source in the three-dimensional shape measuring method using the light-section method, the slit light (a single slit light, a plurality of slit lights) formed by the pattern forming unit and the projection lens disposed on the optical axis is projected on the object for measurement via the reflective optical system while being stopped asymmetrically in the slit direction and the direction perpendicular thereto, the projected slit light is picked up, and the three-dimensional shape of the object for measurement is measured thereby.

According to each method, the size of the entire measuring apparatus can be reduced by using the reflective optical system 15 or 16.

Fourth Embodiment

Figure 10:
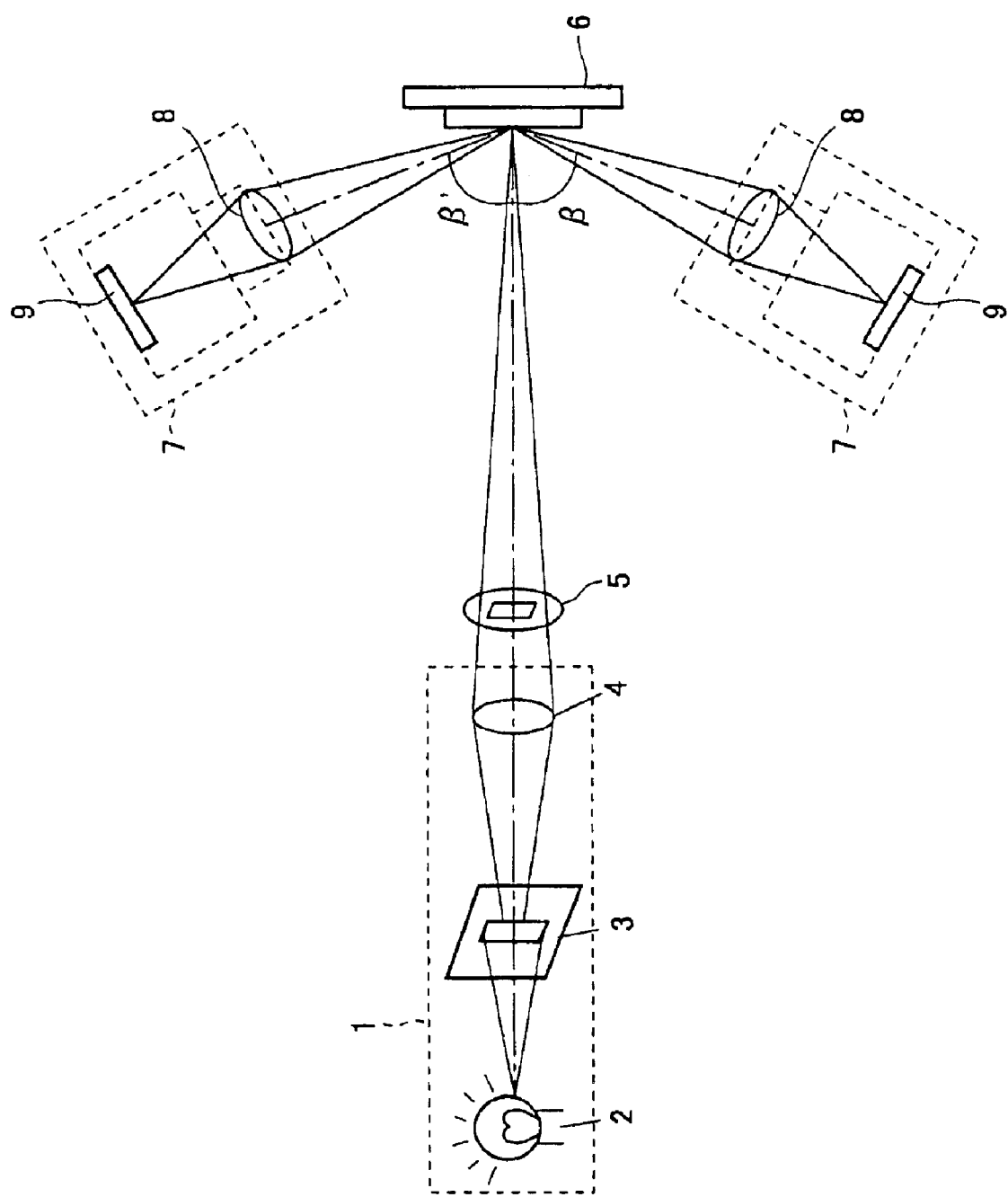
FIG. 10 is a schematic view of a three-dimensional shape measuring apparatus according to a fourth embodiment of the present invention.

A fourth embodiment of the present invention will be described with reference to FIGS. 10 and 11. In the fourth embodiment, a plurality of image pickup optical systems (detection units) 7 and 7', for example, two of them, are further provided in the fourth embodiment as shown in FIG. 10.

Accordingly, in the fourth embodiment, the projection optical system 1 is set with respect to the object 6 for measurement so that the optical axis of the light reaching the object 6 from the projection optical system 1 is along the virtual normal direction on the object 6 for measurement.

In addition, the two image pickup optical systems (detection units) 7 and 7' are set so that the image pickup angles forming the optical axes of the reflected light from the object 6 for measurement are respectively β and β'. The plurality of image pickup optical systems 7 may be respectively set at equal intervals (i.e., at equal angles) to each other with respect to the virtual normal on the object 6 for measurement.

In the three-dimensional shape measuring method using the light-section method, the projection optical system 1 and the image pickup optical system may be installed at the angles different from each other, and if there is an obstacle such as a wall in the vicinity of the object for measurement, a part of the object 6 for measurement may be concealed by the shadow of the obstacle, and less easily seen (forming a dead angle), and the measurement of the three-dimensional shape may be incorrect.

However, by providing the plurality of image pickup optical systems 7 and 7' in the fourth embodiment as described above, the dead angle formed by the obstacle can be eliminated, the entire range of the object 6 for measurement can be measured, and the accuracy of measurement can be improved.

Figure 11:
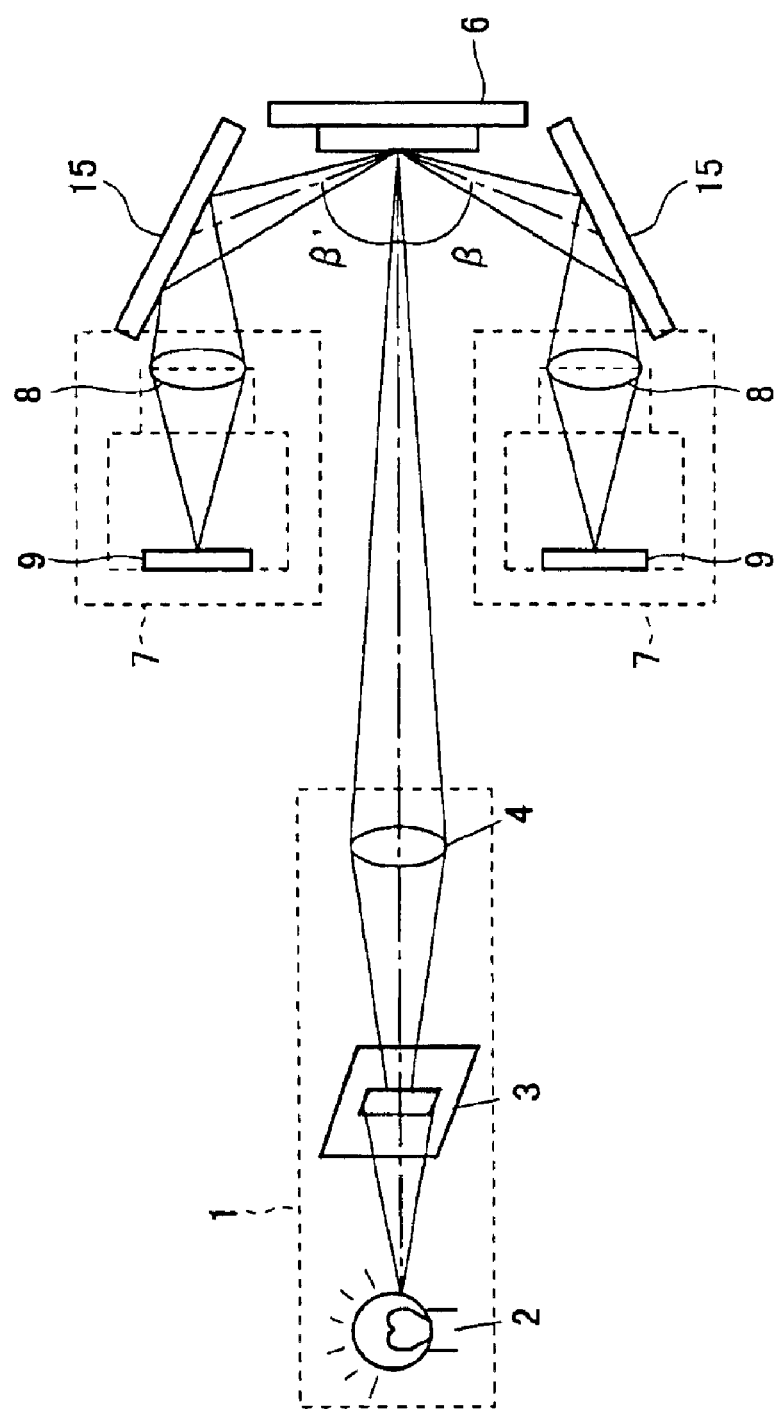
FIG. 11 is a schematic view of a modification of the three-dimensional shape measuring apparatus.
Figure 12:
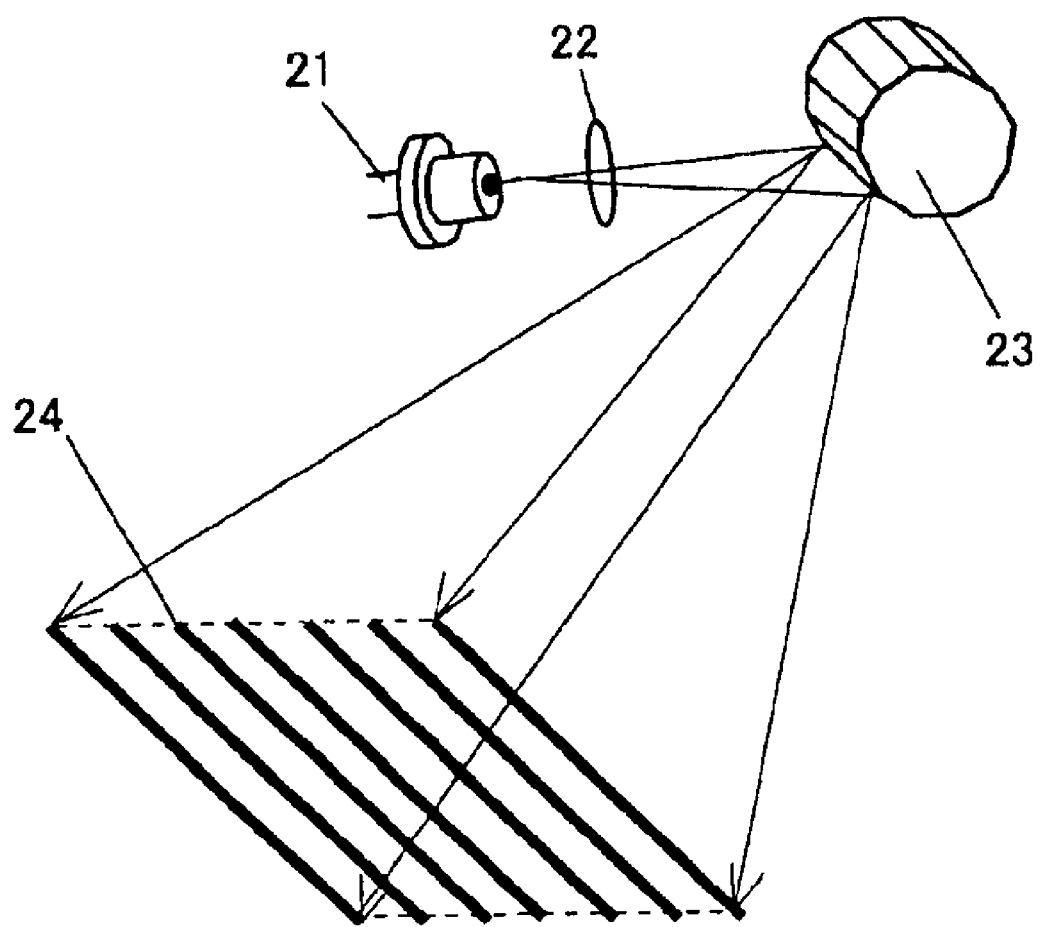
FIG. 12 is a schematic view of a method for forming a slit light in a conventional three-dimensional shape measuring method.

In addition, in the fourth embodiment, mirrors 15 and 15' may be provided, as in the third embodiment as shown in FIG. 11. The accuracy of measurement can be improved, and the size of the entire measuring apparatus can be reduced at the same time.

As described above, in the three-dimensional shape measuring method according to the fourth embodiment, a white light source is used for a light source in the three-dimensional shape measuring method using the light-section method, the slit light (a single slit light, a plurality of slit lights) formed by the pattern forming unit and the projection lens disposed on the optical axis thereof is projected on the object for measurement while being stopped asymmetrically in the slit direction and the direction perpendicular thereto, the projected slit light is picked up by at least two sets of image pickup optical systems from directions different from each other, and the three-dimensional shape of the object for measurement is measured thereby.

In another three-dimensional shape measuring method according to the fourth embodiment, a white light source is used for a light source in the three-dimensional shape measuring method using the light-section method, the slit light (a single slit light, a plurality of slit lights) formed by the pattern forming unit and the projection lens disposed on the optical axis thereof is projected on the object for measurement via the reflective optical system while being stopped asymmetrically in the slit direction and the direction perpendicular thereto, the projected slit light is picked up by at least two sets of image pickup optical systems from directions different from each other, and the three-dimensional shape of the object for measurement is measured thereby.

According to each method described above, the accuracy of shape measurement can be improved by using at least two sets of the image pickup optical systems, and the size of the entire measuring apparatus can be reduced by using the reflective optical system.

The present invention is not limited to each of the above embodiments, but various kinds of modification can be added to the scope, and embodiments obtained by adequately combining the disclosed technical means in different embodiments are included in the technical scope of the present invention.

As described above, in the three-dimensional shape measuring method of the present invention, the slit light from the light source is stopped by the asymmetric diaphragm, and projected on the object for measurement, and the three-dimensional shape of the object for measurement is measured by the light-section method based on the light from the slit light reflected by the object for measurement.

Accordingly, the degree of reduction of the quantity of light is reduced, the focal depth of the multi-slit light can be increased, and the three-dimensional shape can be measured with high accuracy.

Although the present invention has been described in relation to particular embodiments thereof, many other variations and modifications and other uses will become apparent to those skilled in the art. Therefore, the present invention is not limited by the specific disclosure herein.

What is claimed is:

1. A three-dimensional shape measuring method using a light-section method, comprising the steps of:
   producing a slit light from an optical system having a light source;
   stopping said slit light asymmetrically in a slit direction and a direction perpendicular thereto;
   projecting said slit light onto an object for measurement;
   detecting said slit light as reflected by said object; and
   measuring a three-dimensional shape of said object on the basis of said reflected slit light.

2. A three-dimensional shape measuring method according to claim 1, comprising the step of producing a plurality of said slit lights.

3. A three-dimensional shape measuring method according to claim 1, wherein said light source is less coherent than a laser beam.

4. A three-dimensional shape measuring method according to claim 1, wherein said light source is a white light source.

5. A three-dimensional shape measuring method according to claim 1, wherein said stopping step is performed between said producing step and said projecting step.

6. A three-dimensional shape measuring method according to claim 1, wherein said stopping step is performed following said projecting step.

7. A three-dimensional shape measuring method according to claim 1, further comprising the step of reflecting said slit light with a reflector which is disposed for receiving said reflected light from said object.

8. A three-dimensional shape measuring method according to claim 1, further comprising the step of reflecting said slit light with a reflector which is disposed for reflecting said slit light onto said object.

9. A three-dimensional shape measuring method according to claim 1, wherein said detecting step is performed with a single detector.

10. A three-dimensional shape measuring method according to claim 1, wherein said detecting step is performed with a plurality of detectors.

11. A three-dimensional shape measuring method according to claim 1, wherein said asymmetric stopping step is performed by using an asymmetric diaphragm.

12. A three-dimensional shape measuring method according to claim 11, further comprising the step of centering the diaphragm on the optical axis.

13. A three-dimensional shape measuring method according to claim 11, further comprising the step of using an asymmetric diaphragm having an aperture whose size in the slit direction is smaller than its size in the direction perpendicular to the slit direction.

14. A three-dimensional shape measuring method according to claim 13, further comprising the step of centering the diaphragm on the optical axis.

15. A three-dimensional shape measuring method according to claim 1, further comprising the step of centering the diaphragm on the optical axis.

16. A three-dimensional shape measuring apparatus comprising:
   an optical system having a light source, a pattern forming unit which is disposed on the optical axis of said light source to form a slit light using the light from said light source, and a projection lens to collect the slit light on an object for measurement;
   an asymmetric diaphragm having an aperture to stop said slit light asymmetrically in a slit direction and a direction perpendicular thereto; and
   a detection unit which measures a three-dimensional shape of said object for measurement on the basis of said slit light as reflected from said object for measurement.

17. A three-dimensional shape measuring apparatus according to claim 16, wherein said pattern forming unit forms a plurality of slit lights.

18. A three-dimensional shape measuring apparatus according to claim 16, wherein said light source is less coherent than a laser beam.

19. A three-dimensional shape measuring apparatus according to claim 16, wherein said light source is a white light source.

20. A three-dimensional shape measuring apparatus according to claim 16, wherein said asymmetric diaphragm is disposed between said light source and said projection lens.

21. A three-dimensional shape measuring apparatus according to claim 16, wherein said asymmetric diaphragm stops light received from said projection lens.

22. A three-dimensional shape measuring apparatus according to claim 16, further comprising a reflector disposed for receiving said reflected light from said object.

23. A three-dimensional shape measuring apparatus according to claim 16, further comprising a reflector disposed for reflecting said slit light onto said object.

24. A three-dimensional shape measuring apparatus according to claim 16, wherein said detection unit comprises a single detector.

25. A three-dimensional shape measuring apparatus according to claim 16, wherein said detection unit comprises a plurality of detectors.

26. A three-dimensional shape measuring apparatus according to claim 16, wherein said aperture in said asymmetric diaphragm is centered on said optical axis.

27. A three-dimensional shape measuring apparatus according to claim 16, in which the size of the aperture in the slit direction is smaller than the size of the aperture in the direction perpendicular to the slit direction.

28. A three-dimensional shape measuring apparatus according to claim 27, wherein said aperture in said asymmetric diaphragm is centered on said optical axis.

* * * * *